E. M. HAWKINS.
SHEAR MECHANISM.
APPLICATION FILED MAY 16, 1918.
1,321,207.
Patented Nov. 11, 1919.
4 SHEETS—SHEET 2.
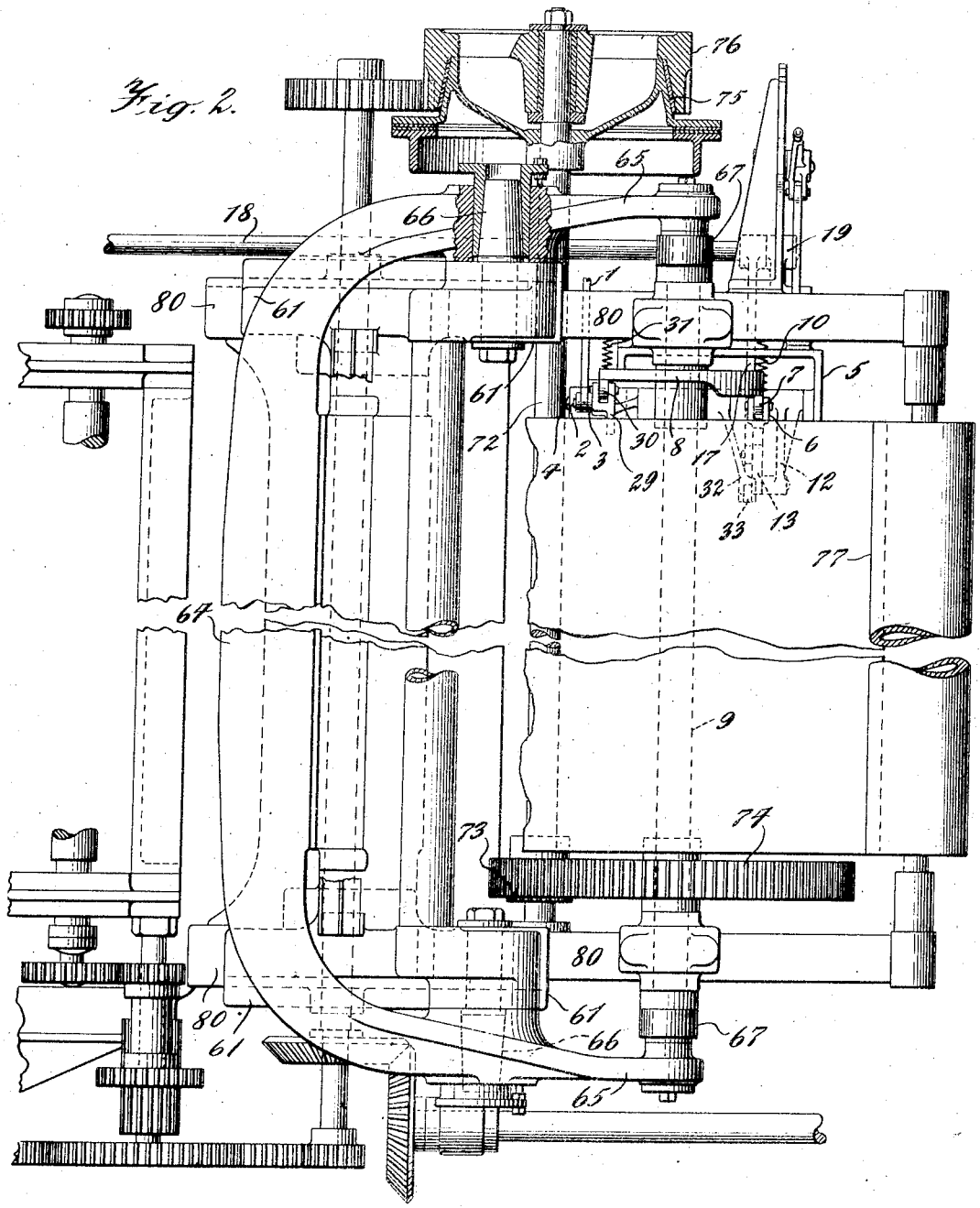
WITNESS:
Geo. C. Cheney.
INVENTOR.
Edgar M. Hawkins
BY
Chas. F. Dane
ATTORNEY.

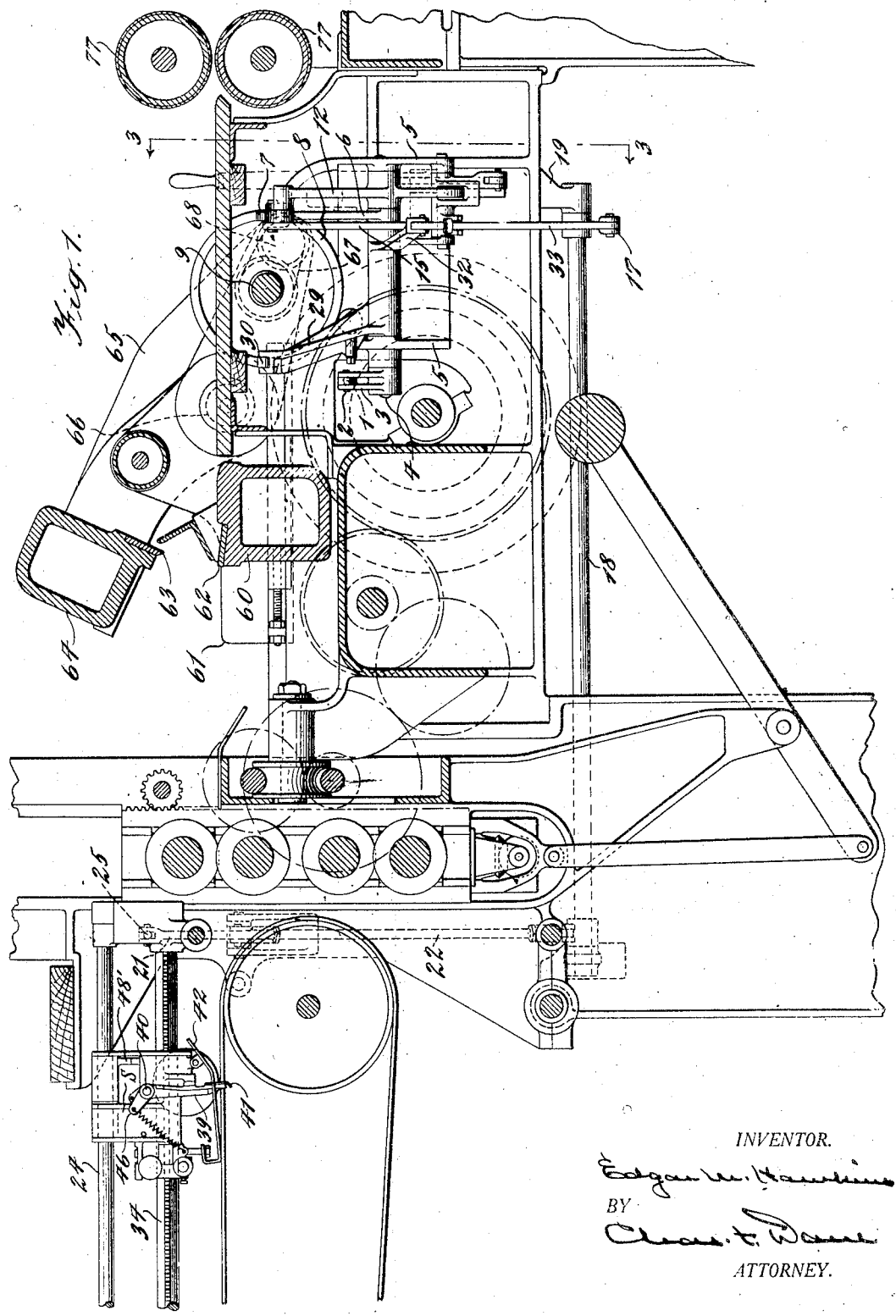

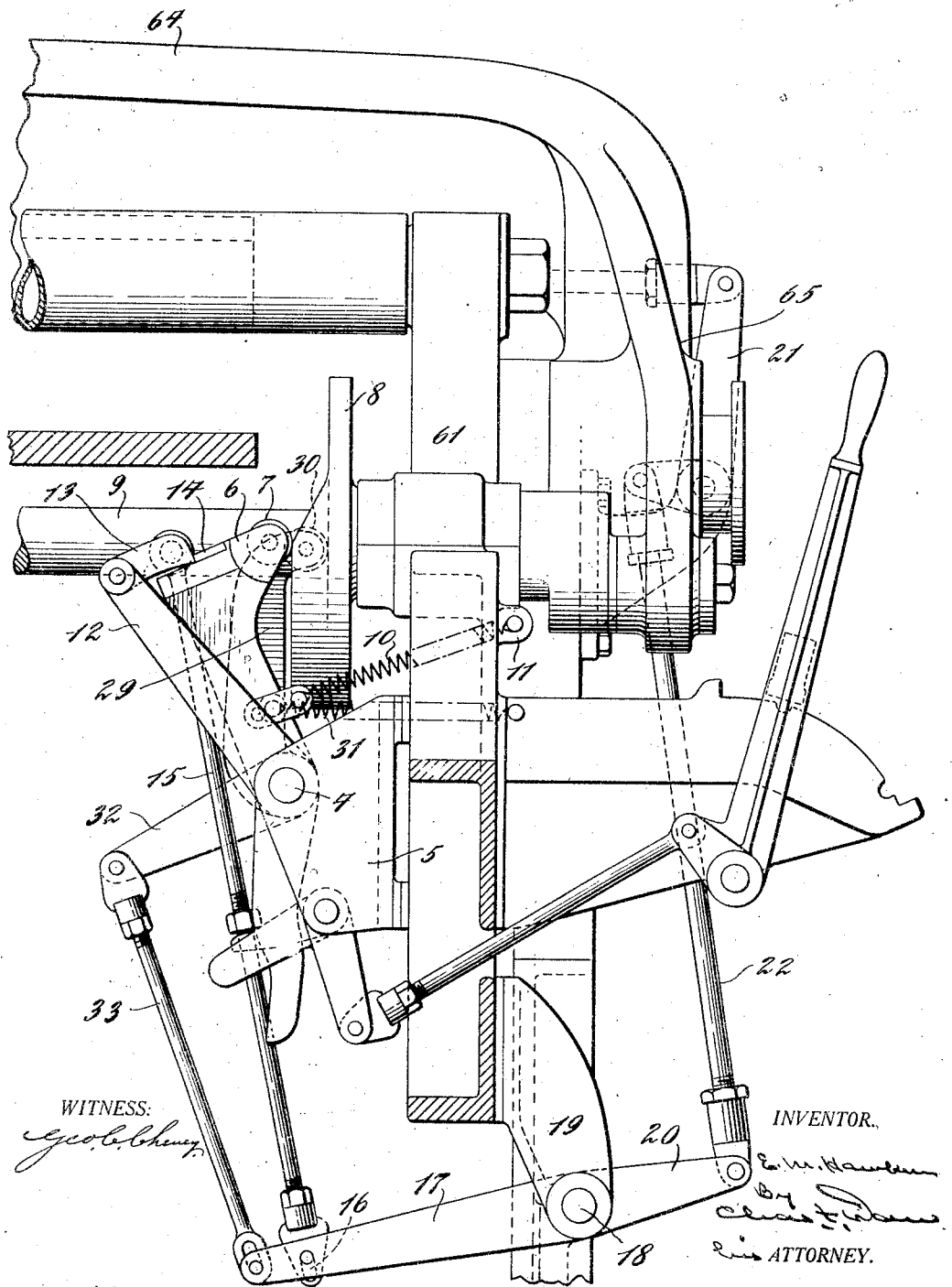

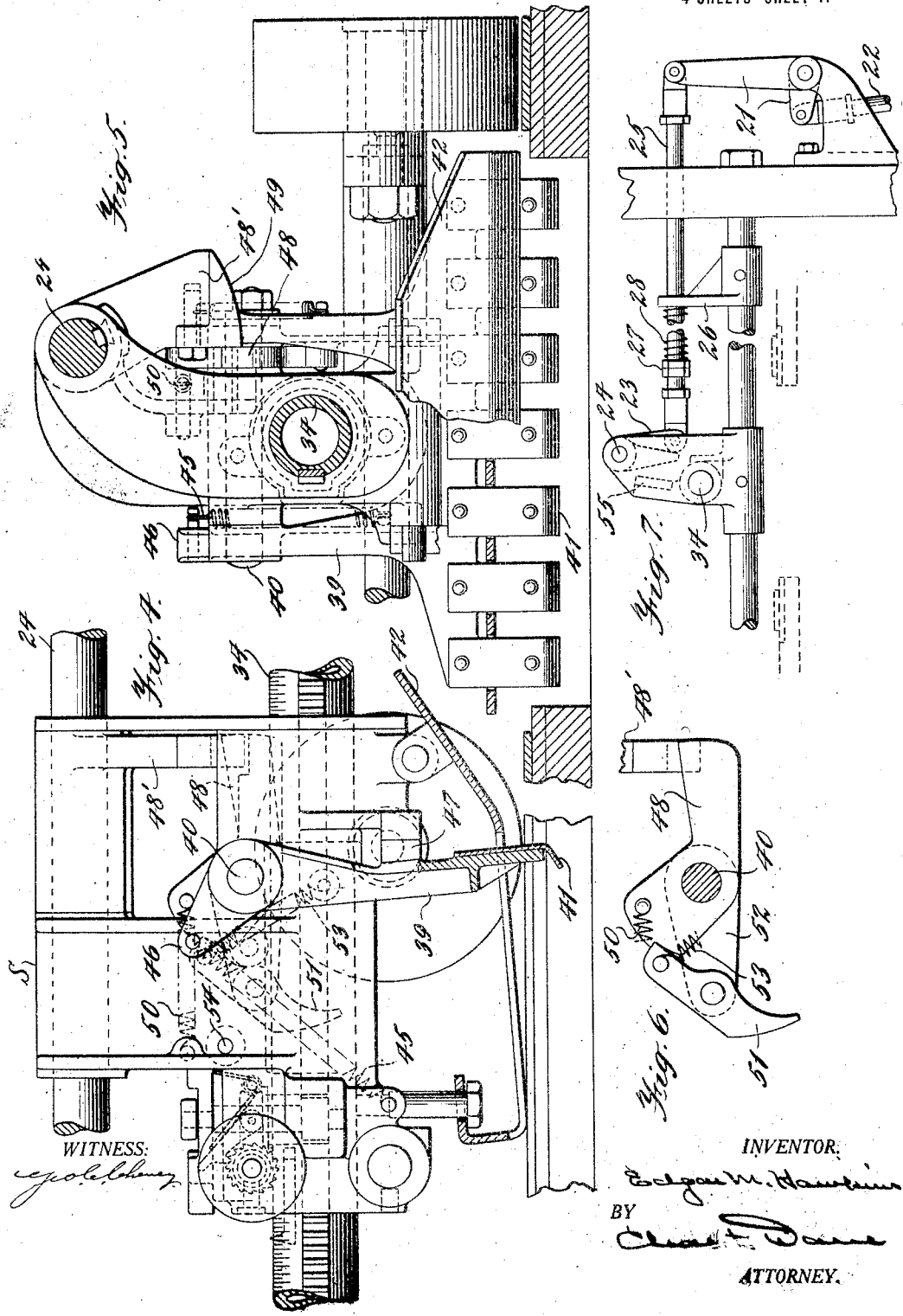

UNITED STATES PATENT OFFICE.

EDGAR M. HAWKINS, OF ROCHESTER, NEW YORK, ASSIGNOR TO M. D. KNOWLTON COMPANY, OF ROCHESTER, NEW YORK, A CORPORATION OF NEW YORK.

SHEAR MECHANISM.

1,321,207.  Specification of Letters Patent.  Patented Nov. 11, 1919.

Application filed May 16, 1918. Serial No. 234,898.

*To all whom it may concern:*

Be it known that I, EDGAR M. HAWKINS, a citizen of the United States, and resident of Rochester, in the county of Monroe and State of New York, have invented certain new and useful Improvements in Shear Mechanism, of which the following is a specification.

This invention relates to shear mechanism of the type disclosed in the co-pending application of Otto M. Hoch, Serial No. 67,799, filed December 20, 1915, which is capable of cutting a web of moving material transversely without interrupting movement of the web or without necessitating stoppage of the movement of the web before the cutting operation. This is accomplished in the machine of the aforesaid application by mounting the shear blades for movement parallel with the movement of the web and providing actuating means for imparting movement to the shear blades during the cutting action so that said shear blades will move with the web during the cutting action.

In the machine of the aforesaid application the upper or vertically movable shear blade is mounted for reciprocation in guideways on the horizontally sliding frame which carries the shear blades. In the present case, however, and in accordance with my invention, I pivotally mount the upper shear blade on said sliding frame so that it will have a swinging or oscillating movement to and from its cutting position relative to the lower or stationary blade, and provide actuating means that will act to both oscillate said upper blade and move the sliding frame so that the shear blades thereon will move with the web during the cutting operation. By mounting and operating the upper blade in this way I am enabled to provide a shear mechanism of fewer parts and less weight than that of the aforesaid application and one that is capable of substantially greater speed, which is an important desideratum in machines of the class on which the present shear mechanism is especially intended for use.

The shear mechanism herein disclosed is designed especially for cutting a web of lined corrugated board transversely into blanks, but it will of course be obvious that the type of web operated upon is immaterial.

The invention is illustrated in the accompanying drawings, in which—

Figure 1 is a longitudinal vertical section through part of a machine of the type referred to, equipped with a shear mechanism embodying my invention;

Fig. 2 is a top plan of the shear mechanism shown in Fig. 1;

Fig. 3 is an enlarged vertical section taken on the line 3—3 of Fig. 1, looking in the direction indicated by the arrows;

Fig. 4 is an enlarged detail of part of a trip mechanism for controlling the operation of the shear mechanism;

Fig. 5 is a similar view looking from the right as viewed in Fig. 4; and

Figs. 6 and 7 are details of said trip mechanism to be hereinafter referred to.

Referring to the drawings and particularly to Figs. 1, 2 and 3, it will be noted that a lower cutter bar 60 is provided, which extends transversely of the machine and is mounted at its ends in shear frames 61, there being one of such shear frames at each side of the machine as shown in Fig. 2. The cutter bar 60 carries a shear blade 62 with which the upper shear blade 63 coöperates, the latter being carried by a swinging or oscillating frame 64.

The frame 64 is here shown as being substantially U-shape, with the central or cutter-carrying portion of the same extending transversely of the machine and with its opposite arms 65 journaled on fulcrum studs 66 attached to the shear frames 61, as best shown in Fig. 2.

The two shear frames 61, together with the shear blades and their supports including the pivoted frame for the upper blade, are mounted for movement as a unit longitudinally of the machine, and for this purpose, the shear frames 61 are mounted upon guides 80 formed on the bed of the machine.

Reciprocating movement is imparted to the shear frames 61, and hence to the supported cutters, by actuating means which are also adapted to lower and raise the upper cutter during the reciprocation of the shear frames. This is accomplished by providing a transversely-extending crank shaft 9 having at its opposite ends crank arms 67 provided with crank pins 68, the latter being connected directly with the ends of the arms 65 of the upper cutter carrying frame Rotation of this crank shaft 9 will oscillate the cutter frame 64 about its fulcrum supports to lower and raise the supported shear blade to and from its cutting position relative to the lower blade, and also impart a horizontal reciprocating motion to the shear frames by reason of the connection of the cutter frame 64 therewith at the fulcrum points 66. It will be noted that when the crank pins 68 rotate from the position shown in Fig. 1 in an anti-clockwise direction, the shear frames, together with the upper and lower shear blades, will move to the left in Fig. 1, which, as will hereinafter appear, is the same direction in which the web of material passes between the shear blades. Approximately at the time when the shear frames attain their maximum speed and are moving at about the same speed as the web of material, the cutting action will take place. This is due to the fact that the cutting action takes place when the crank pins 68 are at approximately their highest points, and at this time also the shear frames are moving at their maximum speed. The second half of each revolution of the crank pins 68 will, of course, return the shear frames to their normal position and return the upper shear blade to its raised position.

The means here shown for actuating the crank shaft 9 is substantially the same as that disclosed in the aforesaid application, to which reference may be had. This means, briefly described, comprises an actuating shaft 72 which is geared to the shaft 9 by the meshing gears 73 and 74 carried by the actuating shaft and the crank shaft respectively. The rotation of the actuating shaft 72 is controlled by a friction clutch, the two members of which are shown at 75 and 76. The cone member 75 is keyed to the actuating shaft 72 but is mounted to slide thereon, while the clutch member 76, which constitutes the driving member, is mounted to rotate freely upon the extremity of the shaft 72.

The construction of the actuating means for controlling the engagement of the clutch members 75 and 76 will depend largely upon the relation in which the shear mechanism is used. In the present instance, the engagement and disengagement of the clutch members are adapted to be controlled by a sheet trip. The crank shaft is thus set in operation and is allowed to make one complete revolution, at which time the clutch members are thrown out of engagement by the means to be presently described. Before the sheet trip and this means for throwing out of engagement the clutch members are described, it should be mentioned that the web of material is positively fed to the shear mechanism by suitable feeding means which, as here shown, includes a pair of feed rolls 77, 77.

The sheet trip here shown for automatically controlling the operation of the shear mechanism, is that disclosed in the co-pending application of Otto M. Hoch, Serial No. 161,379, filed April 11, 1917, to which reference may be had. This sheet trip, which is here designated generally by the reference character S, is adapted to be actuated by the forward edge of the moving web of material to effect operation of the shear mechanism by causing engagement of the clutch members. The clutch here shown is, as in the aforesaid application, controlled by a clutch rod 1, which rod is pivoted at 2, on an arm 3. This arm 3 is secured to a shaft 4 which is supported in a bracket 5 carried by the frame of the machine. Mounted loosely on the shaft 4 is a cam lever 6 which carries a roller 7 at its upper or free end. This roller 7 is adapted to coöperate with a cam 8 which is provided with high and low portions, as illustrated in Fig. 3 of the drawings, and is mounted on the crank shaft 9, which shaft is actuated by the engagement of the clutch members as hereinbefore referred to. This cam roller 7 is normally maintained in engagement with the surface of the cam by a spring 10 which is secured to the cam lever and to a stationary portion of the frame at 11. An arm 12 is secured to the shaft 4 and carries at its upper end, a pivoted pawl 13 which is arranged to engage a wear-block 14 on the cam lever 6, as disclosed in Fig. 3. This pawl 13 is adapted to be moved out of engagement with said wear-block 14 by a rod 15 which is secured to the pawl and has a lost motion connection at 16 with an arm 17 carried by and rigid with a shaft 18, which shaft is mounted in suitable brackets 19 on the frame of the machine. A second arm 20 extends from this shaft 18 and is connected to a bell crank lever 21 by means of a connecting link 22. This lever 21 is attached to a crank arm 23, which is mounted rigidly on an oscillatory shaft 24, by means of a connecting rod 25. This shaft 24 is carried by the trip casing S, as disclosed in Fig. 4 of the drawings. The rod 25 passes through a bracket 26 and is provided with a collar 27, between which collar and bracket a coil spring 28 is mounted and surrounds the rod 25, which spring, when relieved of its confinement, moves the rod 25, and, through the connecting elements, lifts the pawl 13 from engagement with the wear-block 14. Thus, when the shaft 24 is permitted to oscillate so that the arm 23 thereon will move to the left in Fig. 7, under the action of the spring 28, the pawl 13 will be lifted from its engagement with the block 14 and the clutch rod 1 permitted to move under the influence of its actuating spring (not shown) to cause engagement of the clutch members so that the shearing mechanism will be actuated.

In order that the parts may be reset and the spring 28 again placed under compression, a cam lever 29 is loosely mounted on the shaft 4 and is provided with a roller 30, which is normally maintained in engagement with the face of the cam 8 by a spring 31. Rigid with and extending in angular relation to the cam lever 29 is an arm 32, which is connected, by a lost motion connection through a link 33, with the arm 17. Thus, when the cam 8 is rotated after the clutch members have been engaged, as previously described, the riding of the roller 30 on the high portion of the cam 8 will cause the downward movement of the link 33, and the consequent reëngagement of the pawl 13 with the wear-block 14, and the placing of the spring 28 under compression, so that it will be ready for a subsequent operation.

In order that the rod 25 may be permitted to move at the proper times to cause the interengagement of the members of the clutch, and the consequent operation of the shearing mechanism, the sheet trip, which has been previously referred to and designated by the reference character S, is provided. This trip includes a casing, which, as aforesaid, supports the shaft 24 and which is adjustably mounted on a graduated tube 34. A trip lever 39 is pivoted on a shaft 40 on the trip casing and is provided with fingers at its lower end which are faced with wear-plates 41, which fingers extend through slots in the stripper 42. The lower end of the trip lever 39 lies in the path of movement of the web of material which passes beneath the stripper 42, and by which latter, the upper liner of the web, when the latter is corrugated board, is prevented from curling. This lower end of the trip lever 39 is maintained in its forward position by means of a spring 45 which is attached to an arm 46 on the lever and forces the lower end of the lever into engagement with a stop 47 on the casing. Pivoted loosely on the shaft 40 is a latch 48, which is of angular form, and is provided with an extending portion arranged to engage a latch arm 48', which is keyed to the shaft 24, so that it will oscillate with the latter, but so that it will move with the casing and with relation to the shaft. This latch arm 48' is provided at its lower end with a shoe 49, for a purpose which will later become apparent. The latch 48 is normally held in the path of movement of the latch arm 48' so that the movement of the latter, under the influence of the spring 28, is prevented, by a spring 50. A pawl 51 is pivoted to an extension 52 of the trip lever 39, and the upper end of this pawl is normally held in engagement with a notch in the adjacent end of the latch 48 by a spring 53. Thus, when the trip lever 39 is moved against the action of the spring 45 by the moving web of material, the pawl 51 will likewise be moved, and because of its engagement with the latch 48, will cause the latter to pass from the path of movement of the latch arm 48', so that the spring 28 will be free to operate until the movement of the latch arm 48' is arrested by a stop 55. This engagement of the pawl 51 and the latch 48 is maintained until the tail of the pawl contacts with a stop 54, at which time the pawl will be forced out of engagement with the notch in the latch 48, and the spring 50 will move the end of the latch 48 into engagement with the lower cam face of the shoe 49, so that upon the movement of the rod 25 in the opposite direction, and the consequent rotation of the shaft 24, the latch 48 will again be permitted to assume its original position and prevent the movement of the latch arm 48' until again released by the trip lever 39.

While the operation of the trip mechanism so far described is thought to be clear from the preceding description, a brief summary is here given. When the web of material is fed beneath the stripper 42 and engages the trip lever 39, it moves the latter rearwardly, and upon such movement, the latch 48 is disengaged from the latch arm 48'. Immediately upon such disengagement, the engagement of the tail of the pawl 51 with the stop 54 disengages the pawl from the notch in the latch 48 and permits the spring 50 to force the latch into engagement with the shoe 49 of the latch arm 48'. When the latch arm 48' is released, the spring 28 moves the rod 25 and through the connecting elements disengages the pawl 13 from the wear-block 14 on the cam lever 6, thus permitting the clutch spring (not shown) to operate and engage the clutch members. The engagement of these clutch members causes the rotation of the cam 8, and when this cam has completed a half revolution and the cam lever 29 moves to the high portion of the cam, the spring 28 is again put under compression and the pawl 13 reëngaged through the arm 32 and the related elements. The latch arm 48' at this time moves to its initial position and the latch 48 again prevents its movement until the trip lever is subsequently actuated.

What I claim is:

1. Shear mechanism for cutting a web of moving material, comprising a frame slidable in a direction parallel to the movement of the material, a cutter stationary with the frame, a cutter frame pivoted to the slidable frame, a cutter carried by the cutter frame at one side of its pivotal axis, the ends of said frame extending to the opposite side of the pivotal axis, a crank shaft connected to said extended ends, and means for actuating the crank shaft.

2. Shear mechanism for cutting a web of moving material, comprising a stationary frame, a frame slidable thereon, a cutter carried by the slidable frame, a U-shaped cutter frame pivotally mounted on the slidable frame, a cutter carried by the bight portion of said cutter frame, the legs of said cutter frame being extended beyond its pivotal axis, and a crank shaft mounted on the first mentioned frame, and connected to the extended ends of the cutter frame.

3. Shear mechanism for cutting a web of moving material, comprising a slidable frame, a cutter blade carried by the slidable frame, a U-shaped cutter frame pivoted to the slidable frame, a cutter carried by the bight portion of said U-shaped frame, the legs of said frame extending beyond the pivotal axis thereof, and means connected to said extended ends for oscillating the U-shaped frame and reciprocating the slidable frame.

4. Shear mechanism for cutting a web of moving material, comprising a slidable frame, a cutter carried thereby, a cutter frame pivoted to the slidable frame, a cutter carried by the cutter frame, the ends of the cutter frame extending beyond the pivotal axis thereof, means connected to said ends for reciprocating the slidable frame and oscillating the cutter frame, and means for rendering the aforementioned means inoperative after each complete reciprocation of the slidable frame and each complete oscillation of the cutter frame.

Signed at Rochester, in the county of Monroe, and State of New York, this 13th day of May A. D. 1918.

EDGAR M. HAWKINS.

Witnesses:
Thos. D. Patton,
Hubert J. Martin.